UNITED STATES PATENT OFFICE.

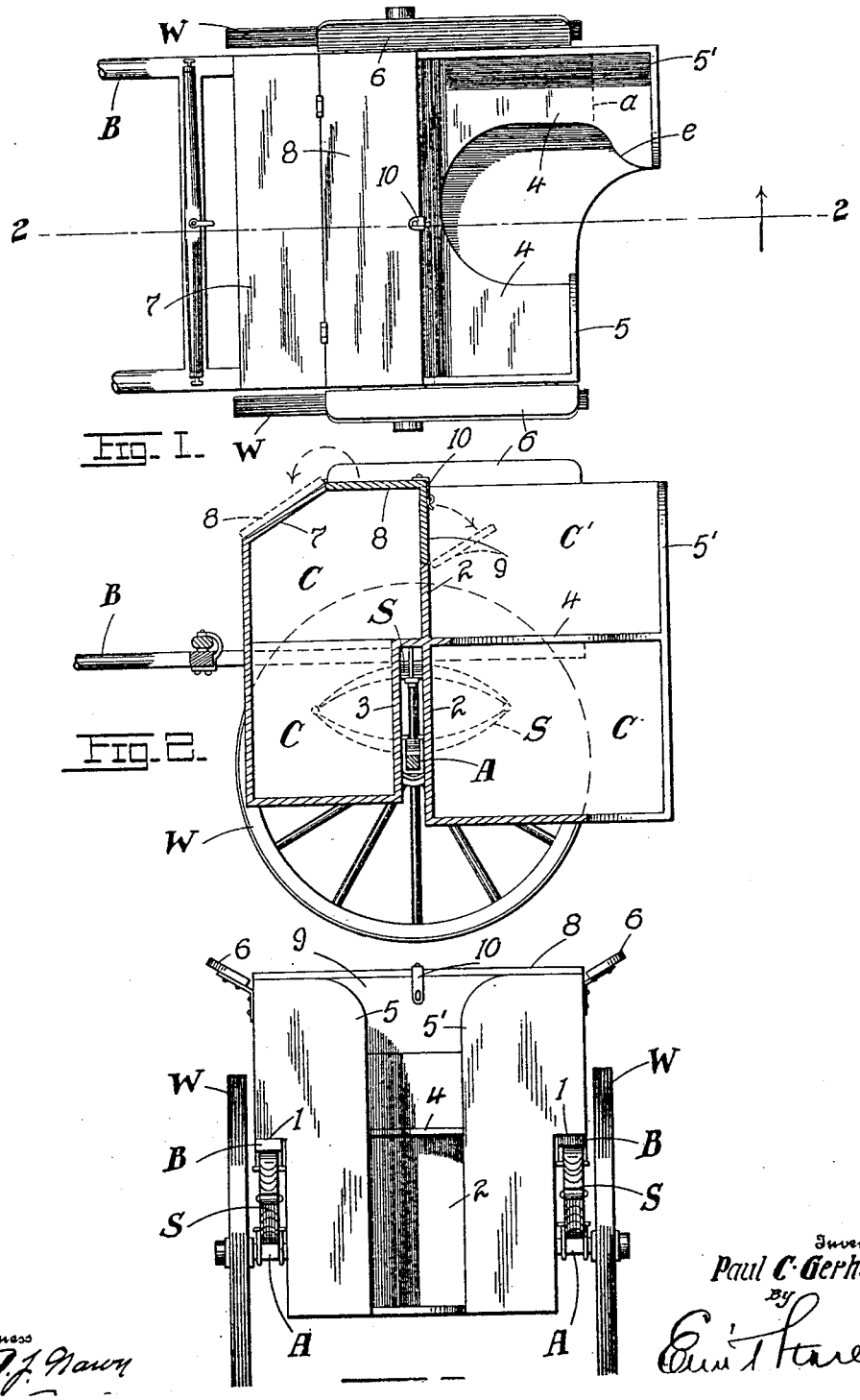

PAUL C. GERHART, OF ST. LOUIS, MISSOURI.

WAGON-BODY.

No. 819,057.　　　　Specification of Letters Patent.　　　Patented May 1, 1906.

Application filed September 21, 1905. Serial No. 279,434.

*To all whom it may concern:*

Be it known that I, PAUL C. GERHART, a citizen of the United States, residing at St. Louis, State of Missouri, have invented certain new and useful Improvements in Wagon-Bodies, of which the following is a full, clear, and exact description, reference being had to the accompanying drawings, forming a part hereof.

My invention has relation to improvements in delivery-wagon bodies; and it consists in the novel construction of body more fully set forth in the specification and pointed out in the claims.

In the drawings, Figure 1 is a top plan of a delivery-wagon, showing my invention applied thereto. Fig. 2 is a vertical longitudinal section on line 2 2 of Fig. 1, and Fig. 3 is a rear elevation thereof.

The object of my invention is to construct a delivery-wagon body designed especially for papers, periodicals, and the like, which shall have a maximum storing capacity, one which shall be perfectly balanced, thereby both removing any dead-weight from the draft-animal and removing any tendency to lift the animal off its feet, one from which its contents cannot become lost, one whose contents is readily accessible from any position in the wagon, one which permits the contents to be conveniently loaded, one making special provision for accommodating the driver, and one possessing further and other advantages better apparent from a detailed description of the invention, which is as follows:

Referring to the drawings, A is the axle of the vehicle, W the wheels, and S the springs. The springs are coupled to the under side of the wagon-body jointly with the shafts B, a lateral horizontal offset 1 being formed on each side of the wagon-body to bring these parts B S within the planes of the sides of the body, Fig. 3. The axle A passes between the lower or depending portions of the main front and rear compartments C C', into which the wagon-body is respectively divided, the transverse vertical wall 2 forming the front wall of the rear compartment and dividing the latter from the front compartment above the plane of the offsets 1, and the wall 3 forming the rear wall of the lower portion of the front compartment. Disposed in the plane of the offsets 1 in the rear compartment C' and secured to the vertical inclosing walls thereof is a ledge 4, whose inner edge has a graceful U-shaped curve, said curve continuing in the form of a reverse extension e on the longer side of the body, the said body, as fully shown in Fig. 1, being longer on one side than on the other, the extension defining the excess in length being continued rearwardly. Advantage of this extension is taken by the driver, who can use that portion thereof up to the dotted line a for a seat while driving and can use the balance of the ledge 4 for storing papers. So, too, can papers be stored away beneath the ledge 4 in the rear compartment C'. The reverse curve e also serves as a graceful guiding edge for the body of the driver in mounting the vehicle. The rear compartment is provided with the rear wing-boards 5 5', forming inclosing walls for the papers stored under the ledge 4. The sides of the body are provided at the top with mud-guards 6.

The front compartment C is preferably formed at the upper front corner with a sloping panel or wall 7, to the rear edge of which is hinged a lid 8 of the same area, so that the lid can be swung open and folded against the panel, as shown by dotted position thereof in Fig. 2. To the upper edge of the wall 2 is hinged a gate 9, which when swung to a closing position may be coupled to the free edge of the lid 8 by means of straps 10 on the order of those used in carriages for securing curtains.

The driver, occupying the inclosure within the curved edge of the ledge 4, can upon opening the lid 8 and gate 9 fill both compartments of the body with perfect ease and little exertion, it being possible to reach to the very bottom of the front compartment without difficulty. The two compartments thus filled balance the body about the axle. Of course the main advantages of the present invention arise from the disposition of the compartments C and C' on opposite sides of the axle and from the extension of one side of the body beyond the opposite side, all other advantages being incidental or ancillary to these.

Having described my invention, what I claim is—

1. A wagon-body having contiguous front and rear compartments depending below the line of the axle, and having suitable provision for the transverse passage of the wagon-axle between them, one side of the wagon-body being longer than the opposite side, and a ledge following the inclosing walls of the body and having one end extended to conform to the longer side of the body, substantially as set forth.

2. A wagon-body having suitable lateral offsets for the accommodation of the vehicle-shafts, and divided into a front and rear compartment respectively, the adjacent walls of the compartments below the plane of the offsets being separated to accommodate the axle of the vehicle, a ledge disposed along the vertical inclosing walls of the rear compartment, and substantially in the plane of the offsets, one end of the ledge extending rearwardly beyond the opposite end, a lid for the front compartment and a gate for the rear compartment adapted to close against the free edge of the lid, substantially as set forth.

3. A wagon-body divided into a front and rear compartment, a lid hinged to and closing the top of the front compartment, a vertical wall separating the upper portions of the compartments, a gate hinged to the said wall and adapted to close against the free edge of the lid, and means for coupling the free edges of the lid and gate for the closed positions thereof, substantially as set forth.

4. A wagon-body having one side longer than the side opposite thereto, and a ledge following the inclosing walls of the body and having one end extended to conform to the longer side of the body, substantially as set forth.

In testimony whereof I affix my signature in presence of two witnesses.

PAUL C. GERHART.

Witnesses:
EMIL STAREK,
M. B. BELT.